United States Patent [19]

Todd

[11] Patent Number: 5,170,443
[45] Date of Patent: Dec. 8, 1992

[54] IMAGE PROCESSOR FOR PROCESSING SOURCE PIXEL INTENSITY VALUES

[75] Inventor: Stephen J. P. Todd, Winchester, United Kingdom

[73] Assignee: International Business Machines Corporation, Armonk, N.Y.

[21] Appl. No.: 625,512

[22] Filed: Dec. 11, 1990

[30] Foreign Application Priority Data

Mar. 7, 1990 [EP] European Pat. Off. ........... 90302405

[51] Int. Cl.$^5$ .............................................. G06K 9/38
[52] U.S. Cl. ..................... 382/50; 340/793; 358/466; 23 2/6
[58] Field of Search ...................... 382/50, 53, 54, 51, 382/6; 358/465, 466, 315, 27, 80, 111; 340/793

[56] References Cited

U.S. PATENT DOCUMENTS

| | | | |
|---|---|---|---|
| 3,104,372 | 9/1963 | Rabinow et al. | 382/50 |
| 3,692,982 | 9/1972 | McMillin | 382/50 |
| 4,317,179 | 2/1982 | Kato et al. | 382/6 |
| 4,438,495 | 3/1984 | Collins et al. | 382/6 |
| 4,497,024 | 1/1985 | Roth | 382/6 |
| 4,791,678 | 12/1988 | Iwase et al. | 382/50 |
| 4,845,761 | 7/1989 | Cate et al. | 382/50 |
| 4,887,305 | 12/1989 | Shimura | 382/51 |
| 4,903,310 | 2/1990 | Takeo et al. | 382/6 |
| 4,977,605 | 12/1990 | Fardeau et al. | 382/51 |
| 5,042,077 | 8/1991 | Burke | 382/6 |
| 5,046,118 | 9/1991 | Ajewole et al. | 382/6 |

FOREIGN PATENT DOCUMENTS 0244111 11/1987 European Pat. Off. .

Primary Examiner—Joseph Mancuso
Attorney, Agent, or Firm—William A. Kinnaman, Jr.

[57] ABSTRACT

Saturation problems are alleviated, when displaying image data on a device capable only of displaying pixel intensity values between a minimum value (Imin) and a maximum value (Imax), by smoothly mapping source intensity values greater than a threshold value (T), which is intermediate the minimum and maximum values, to output intensity values (Io) in a range between the threshold value (T) and the maximum value (Imax). Intensity values darker than the threshold value are not altered by the image generator with the result that image detail in the lower range of values is not lost. In order to maintain the correct color balance where separate color component intensities are defined in the source image data, each color component is mapped in accordance with a mapping determined for the largest color component value.

21 Claims, 4 Drawing Sheets

IMAGE PROCESSOR FOR PROCESSING SOURCE PIXEL INTENSITY VALUES

BACKGROUND OF THE INVENTION

1. Field of the Invention

The present invention relates to an image processor for processing image data to be displayed and, more particularly, to an image processor for processing pixel data defining the intensity values of a source image.

2. Description of the Prior Art

A problem which arises in the generation and processing of images to be displayed on a visual display device or on a printer medium or the like is the physical constraints of the display device or print medium on which the generated image is to be output. Often it is not possible to display the full range of intensity values which exist in the image. What normally happens in such a case is that saturation of the image occurs in an area where the brightness is too great to be displayed. The result of this, particularly in the case of images generated by a computer modelling system, is that harsh edges will be generated where saturation occurs.

Such problems are encountered in photography where a negative film is able to resolve a greater range of brightness values than the prints made from the negative. The simple solution to this problem, which is applied in the photographic world, is to change the exposure time. A disadvantage of this process is that the picture generally becomes darker with the result that detail may be lost in some areas of the screen.

A similar approach could be applied in the case of electronically stored images, by applying a scaling factor to the image values (effectively changing the brightness) so that the range of image values can be effectively resolved on the screen. However, this would also have the effect of darkening the overall image and could result in a loss of detail in the darker areas of the image.

In photography, it is also known to selectively change the exposure time on brighter areas of the picture, without changing it on darker areas. This has the effect of reducing the overall brightness range without further darkening the darker areas. This is, however, a process which is not suitable for automation.

SUMMARY OF THE INVENTION

An object of the invention is to provide an image processor which enables an image to be displayed in such a manner as to minimize saturation while, at the same time, minimizing any loss of detail in the image.

In accordance with the invention there is provided an image processor for processing pixel data defining the intensity values of respective pixels of a source image, said image processor comprising image processing logic for modifying source pixel data for display on output means capable of displaying pixel intensity values between a minimum value (Imin) and a maximum value (Imax), the image processing logic mapping source pixel intensity values (Is) greater than a threshold value (T), which is intermediate the minimum and maximum values, to output pixel intensity values (Io) in a range between the threshold value (T) and the maximum value (Imax) for driving the output means.

The invention enables the saturation problems to be alleviated by smoothly mapping only pixel intensity values above the maximum value which can be displayed (i.e. saturation point) and between a predetermined threshold and the maximum into the range of values between the threshold and the maximum value. In this way, intensity values darker than the threshold value are not altered and as a result, image detail in this range of values is not lost.

In order to provide a smooth mapping, the image processing logic preferably applies a non-linear mapping of source pixel intensity values (Is) greater than the threshold value to give output pixel intensity values (Io) in said range.

The preferred mapping of a source value (Is) greater than the threshold value to give an output value in said range is:

$$Io = Imax - (Imax - T)^2 / (Is + Imax - 2T)$$

This mapping provides a smooth clipping to intensity values up to the maximum value which can be displayed.

In the case where a plurality of component source intensity values (Isi = Is1, Is2, etc.) are defined for each pixel in the source image, the image processing logic determines whether the largest component source intensity value for a pixel in the source image is greater than the threshold value (T), and if so modifies each component source intensity value for that pixel to give component output intensity values (Ioi—Io1, Io2, etc.) for the pixel such that:

$$Ioi = Isi * Vo/Vs; \text{ where}$$

$$Vo = Imax - (Imax - T)^2 / (Is + Imax - 2T); \text{ and}$$

$$Vs = \text{the largest of } Is1, Is2, \text{ etc.}$$

This means that the relative values of the red, green and blue color components are preserved, thus preserving hue and the relative saturation of the color components.

It has been found that an appropriate value for the threshold is approximately 95% of the maximum value where a visual display unit such as a cathode ray tube monitor is used to display the image.

The input image may be held in storage, as may the output image. However, the input image could be input directly from a data capture device and/or the output could be directly to an output device such as a visual display unit which does not need separate storage or a printer.

The image processor may be implemented on a computer workstation or could be implemented as a special purpose device such as a camera which incorporates means for capturing the source image.

BRIEF DESCRIPTION OF THE DRAWINGS

An embodiment of the present invention is described hereinafter with reference to the accompanying drawings in which.

DESCRIPTION OF THE PREFERRED EMBODIMENTS

Figure 1:
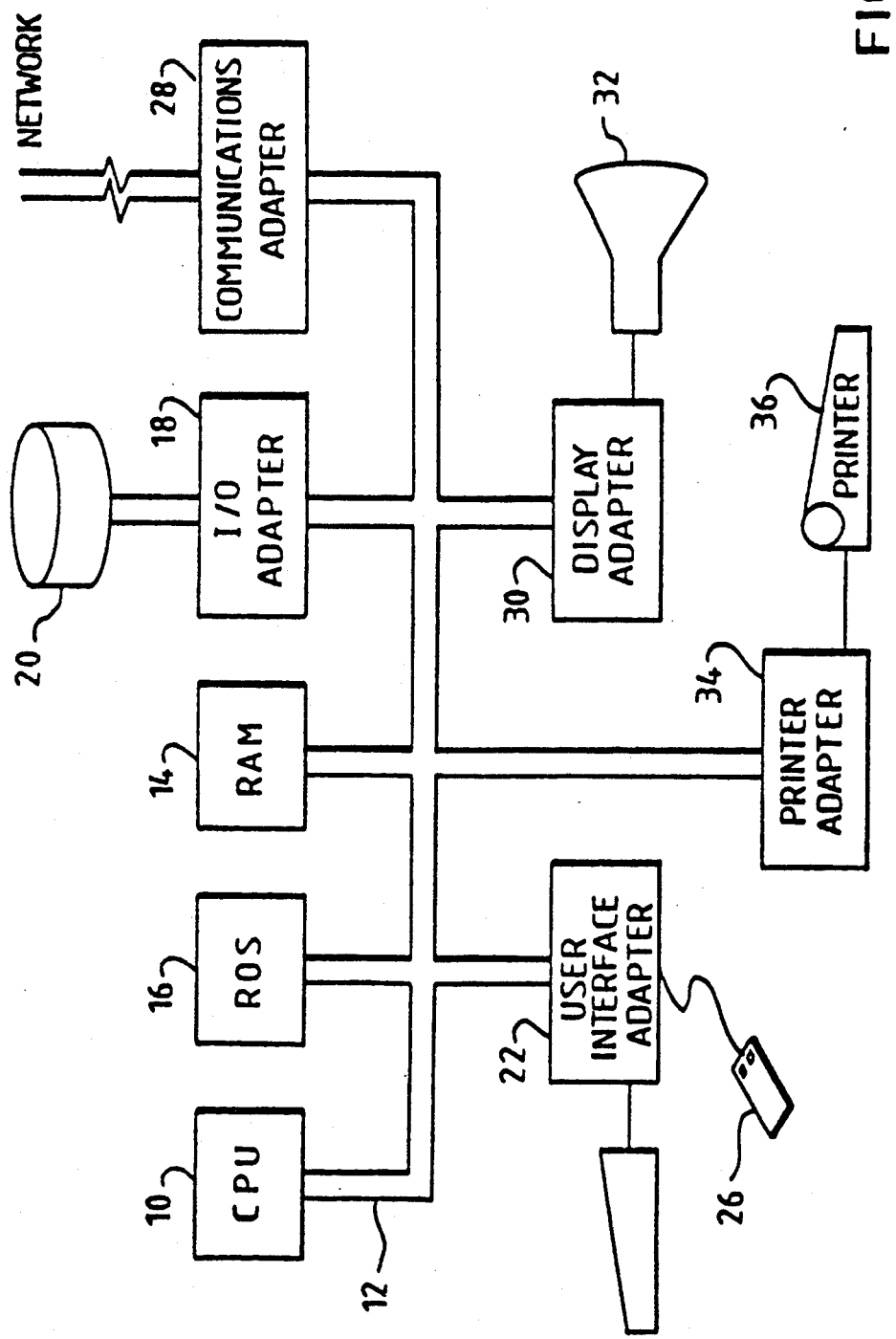
FIG. 1 is an example of an image processing system in the form of a computer workstation.

FIG. 1 illustrates a typical hardware configuration of a workstation with a central processing unit 10 (e.g. conventional microprocessor) and a number of other units interconnected via a system bus 12. The workstation shown in FIG. 1 includes a random access memory (RAM) 14, a read only store (ROS) 16, an I/0 adapter 18 for connecting peripheral devices such as disk units 20 to the bus, a user interface adapter 22 for connecting a keyboard 24 and/or a mouse 26 and/or other user interface devices (e.g. a touch screen controller, not shown) to the bus, a communications adapter 28 for connecting the workstation to a data processing network, a display adapter 30 for connecting the bus to a display device 32 (e.g. a CRT monitor) and a printer adapter 34 for connecting the bus to a printing device 36.

The present invention can be implemented on a workstation as shown in FIG. 1 by the provision of appropriate image processing logic as will be described hereinafter. It should be noted that FIG. 1 illustrates only one example of a hardware configuration suitable for implementing the invention. The hardware of the workstation can be adapted to perform specific tasks as required. For example, a television camera may be connected into the system via the display adapter, or otherwise as appropriate, as an image capture device. No details of such further features are given as such details are not crucial to the present invention. The invention could equally well be implemented on a mainframe data processing system. The invention could also be implemented in a hand held image processing device such as a camera with a digital image store by the provision of appropriate logic for processing the stored image.

Figure 2:
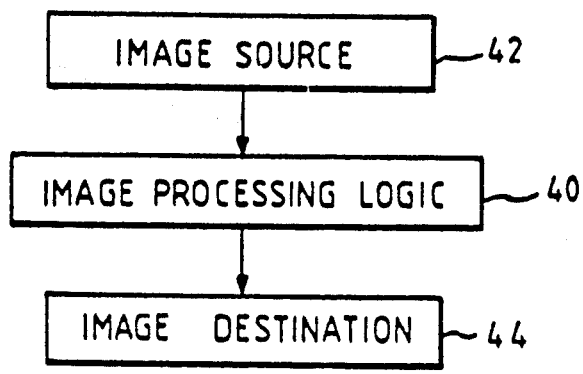
FIG. 2 is a schematic diagram illustrating features on one embodiment of the invention.

FIG. 2 is a schematic diagram illustrating that image processing logic 40 receives pixel data for an image to be displayed from an image source 42 and outputs the processed image data to an image destination 44.

In this embodiment the image source 42 is rendering logic for rendering image data from a definition of a three-dimensional solid object. The rendering logic is stored, in use, in the workstation RAM 14 of FIG. 1. The details of the source of the image pixels need not be described herein as they are not needed for an understanding of the present invention. The image processing logic 40 is also stored, in use, in the workstation RAM 14 and processes the data for each pixel produced by the rendering logic. The image destination 44 is here formed by image post-processing logic for producing final pixel data for storage in a display buffer in the display adapter 30. The functions of the image source 42, the image processing logic 40 and the image destination 44 may together form part of an image processor, although the functions performed by each will normally be independent of one another.

It should be noted that in other examples of the invention, the image source may be another form of image generator, for example an image capture device such as a scanner or camera. Also, the image generator need not form part of the present image processor, the output from the image generator either being transmitted by a communications link to the image processor or held in intermediate storage for processing by the processing logic of the present image processor. In the same way, the output of the image processing logic may be transmitted to a further device connected to the workstation for subsequent display on a visual display monitor or a printer or may be stored in destination storage.

Thus, the image source 42 and/or the image destination 44 of FIG. 2 could, for example, be implemented as respective sets of locations in the workstation RAM 14 of FIG. 1.

Figure 3:
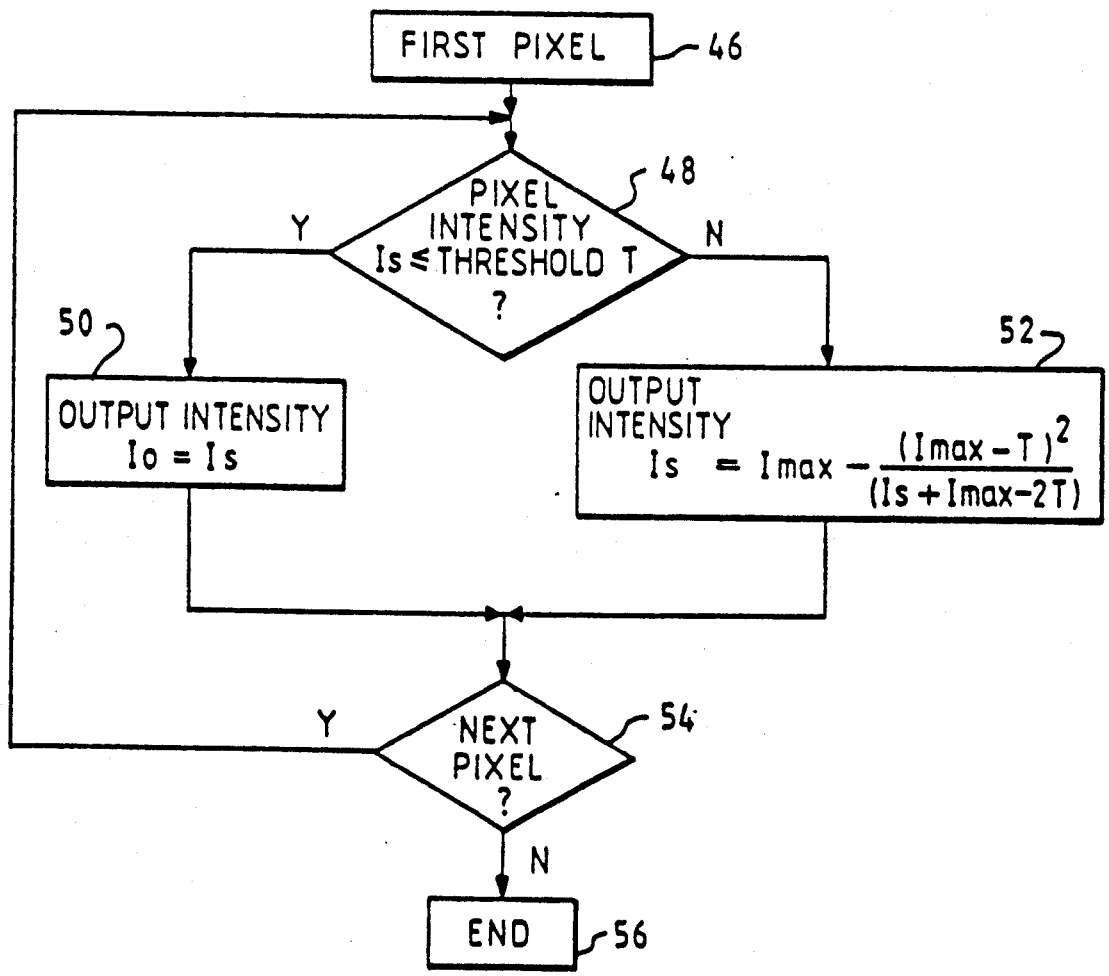
FIG. 3 illustrates one example of image processing logic for the embodiment of FIG. 2.

FIG. 3 illustrates one example of image processing logic for processing image data with a single intensity value per pixel. The processing of the image starts (46) with a first pixel to be processed. The image is processed line-by-line and within each line of the image, pixel-by-pixel. However, another order of processing the image pixel could be adopted, or indeed parallel processing could be employed.

The processing logic tests (48) whether the source pixel value (Is) is less than or equal to a threshold intensity value (T).

If the test at 48 is positive (i.e. the intensity value lies at or below the threshold), the image processing logic outputs (50) the received intensity value (Is) as the intensity value (Io) to be displayed for that pixel.

If the test at 48 is negative, (i.e. the intensity value lies above the threshold value) then the image processing logic outputs (52) an intensity value (Io) for that pixel which is defined by:

$$Io = Imax - (Imax - T)^2/(Is + Imax - 2T)$$

Successive pixel values are processed in this way until it is determined (54) that no more pixels are to be processed for the image whereupon processing of the image terminates (56).

Figure 4:
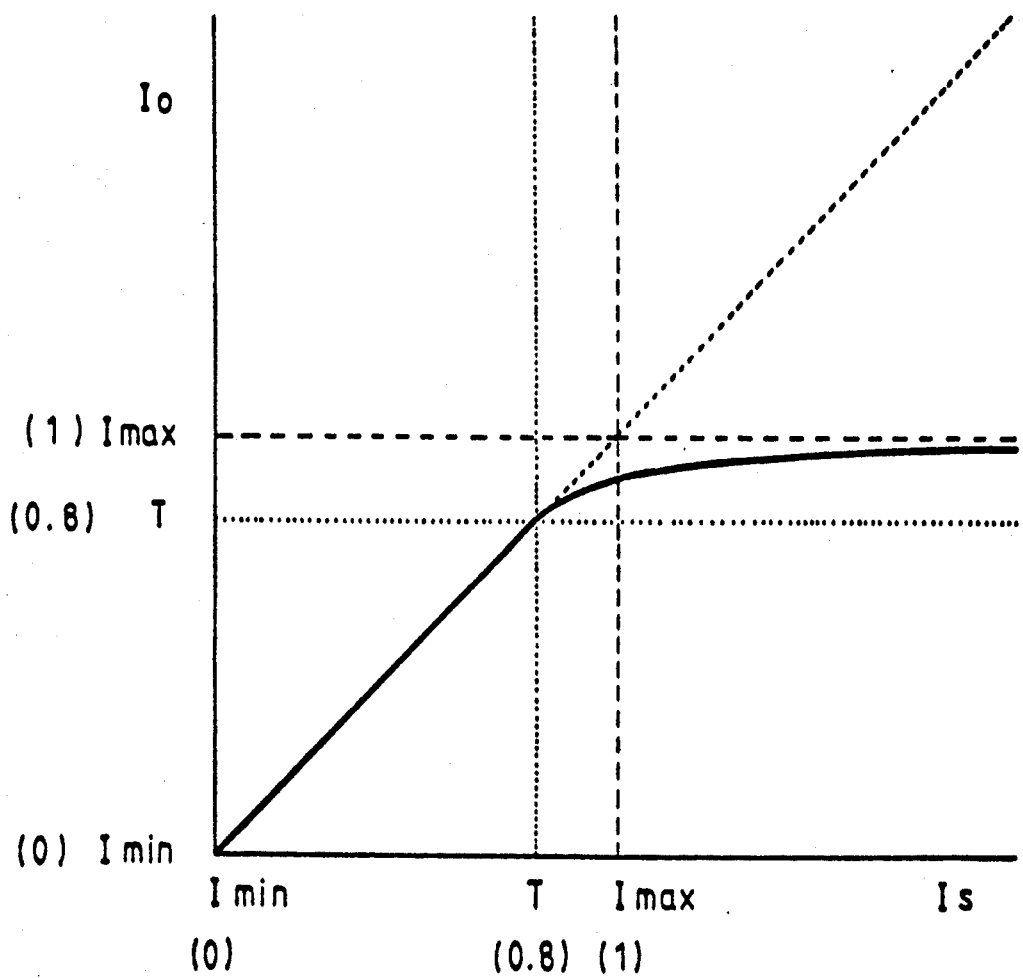
FIG. 4 illustrates the relationship between source and output intensity values.

FIG. 4 illustrates the pixel intensity values (Io) output by the image processing logic as a function of the received pixel intensity values (Is) where:

$$Io = Is \text{ for } Is \leq T; \text{ and}$$

$$Io\text{-}32\ Imax - (Imax - T)^2/(Is + Imax - 2T) \text{ for } Is > T.$$

It has been found that where the range of intensity values which can be displayed on a cathode ray tube display is expressed as a scale of values from 0 to 1 that a suitable threshold point is at an intensity 0.95. A value of T=0.8 has, however, been illustrated in FIG. 4 to highlight the smooth clipping. The source intensity values could, in principle, lie anywhere in a range of zero to infinity. However, in practice the source intensity values will range from between zero and some discrete value greater than 1 on this scale of values. It will be appreciated that these values are merely illustrative, and that the actual values in any particular example of the invention will depend on the physical constraints of the device on which the image is to be displayed.

Figure 5:
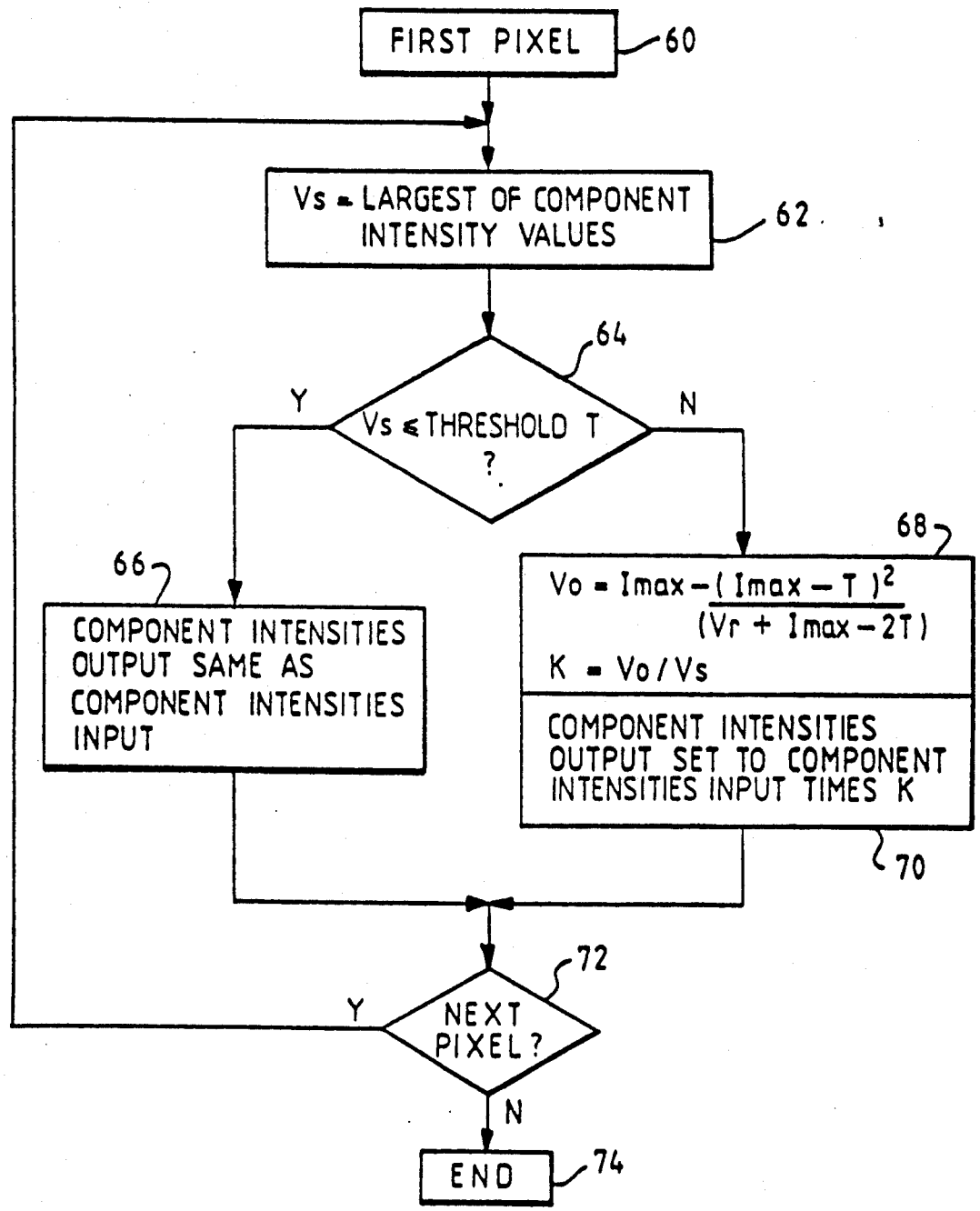
FIG. 5 illustrates a second example of image processing logic for the embodiment of FIG. 2.

FIG. 5 illustrates a second example of image processing logic where the image data to be processed defines red, green and blue component intensity values of each pixel.

The processing of the image starts (60) with a first pixel to be processed. As with the previous example, the image is preferably processed line-by-line, and within each line of the image, pixel-by-pixel.

The processing logic sets (62) a variable value Vs as the maximum of the source red, green and blue component intensity values Isr, Isg, Isb of the image pixel being processed.

The processing logic tests (64) whether the Variable value Vs for the source pixel is less than or equal to a threshold intensity value (T).

If the test at 64 is positive (i.e. the largest of the red, green and blue intensity values lies at or below the threshold), the image processing logic outputs (66) the source red, green and blue intensity values (Ior, Iog, Iob), respectively, to be displayed for that pixel.

If the test at 64 is negative, (i.e. the largest of the red, green and blue intensity values lies above the threshold value), the image processing logic outputs red, green and blue intensity values (Ior, Iog, Iob), respectively for that pixel where:

$$Ior = Isr * Vo/Vs;$$

$$Iog = Isg * Vo/Vs; \text{ and}$$

$$Iob = Isb * Vo/Vs, \text{ where}$$

$$Vo = Imas - (Imax - T)^2/(Is + Imax - 2T)$$

Successive pixel values are processed in this way until it is determined (72) that no more pixels are to be processed for the image whereupon processing of the image terminates (74).

By means of the image processing logic of FIG. 5, the relative values of the red, green and blue color components are preserved, thus preserving hue and the relative saturation of the color components.

Although specific examples of the invention are described herein, the invention is not limited thereto and many modification and alterations are possible.

For example, an alternative algorithm could be used for mapping the received image values into the range of output values depending on the physical constraints of the output device. The specific examples of the invention are concerned with processing intensity values for display of images on a visual display device such as a cathode ray tube monitor. On other types of display devices, each pixel may be defined by a number of component values. For example, a display device may need three chrominance signals and a luminosity signal. It will be appreciated that the example of FIG. 5 could be extended to encompass such a display device by treating four component values rather than three.

In the above example, it is assumed that Imin corresponds to zero intensity. If, however, the minimum displayable value is greater than zero intensity, a similar smooth clipping to that described herein for intensity values above the threshold could be applied to intensity values below a low intensity threshold.

It will be appreciated that the invention is also applicable to the displaying of stored images on display means such as a printing medium. In such a case intensity values will typically be provided for cyan, magenta and yellow pixel components.

An image processing system in accordance with the present invention need not be implemented as a general purpose computer with appropriate control code. For speed of processing, special hardwired logic could be provided for processing the image pixel data. Indeed, an image processing device in accordance with the invention need not be a general purpose computer, although it may incorporate general purpose processors (e.g. microprocessors) for data/image processing. It may be an image processing device such as a camera in which images are created and/or held in terms of image pixel values (e.g. from a CCD image detector), a device specifically designed for processing images to be displayed by display on a visual display device (e.g. a television monitor) or for printing (e.g. for producing video or still pictures), or a combination of both. The image processing logic could be implemented in such a device by means of a suitable programmed microprocessor, by programmed logic circuits such as programmable logic arrays or by other logic circuitry as appropriate.

What is claimed is:

1. An image processor for processing pixel data defining the intensity values of respective pixels of a source image, said image processor comprising image processing logic for modifying source pixel data for display on output means capable of displaying pixel intensity values between a minimum value (Imin) and a maximum value (Imax), the image processing logic comprising:

means for applying a linear mapping of source pixel intensity values (Is) ranging between said minimum value (Imin) and a predetermined threshold value (T) intermediate said minimum and maximum values to give output pixel intensity values (Io) in a range between the minimum value (Imin) and the threshold value (T); and means for applying a non-linear mapping of source pixel intensity values (IS) ranging between said threshold value (T) and an upper limit greater than said maximum value (Imax) to give output pixel intensity values (Io) in a range between the threshold value (T) and the maximum value (Imax), said non-linear mapping having a decreasing slope that approaches zero as said source pixel intensity value increases beyond said threshold.

2. An image processor as claimed in claim 1 wherein the image processing logic maps a source pixel intensity value (Is) greater than the threshold value into said range to give an output pixel intensity value (Io) such that:

$$Io = Imax - (Imax - T)^2(Tmax - T)/(Is + Imax - 2T)$$

3. An image processor as claimed in claim 1 wherein a plurality of component source intensity values (Isi = Is1, Is2, etc.) are defined for each pixel in the source image, the image processing logic determining whether the largest component source intensity value for a pixel in the source image is greater than the threshold value (T), and if so modifying each component source intensity value for that pixel to give component output intensity values (Ioi = Io1, Io2, etc.) for the pixel such that:

$$Ioi = Isi * Vo/Vs;$$

where $$Vo = Imax - (Imax - T)^2(Imax - T)/(vs + Imax - 2T);$$

and $Vs$ = the largest of Is1, Is2, etc.

4. An image processor as claimed in claim 1 wherein the threshold value is approximately 95% of the maximum value.

5. An image processor as claimed in claim 1 comprising a visual display monitor as the output means.

6. An image processor as claimed in claim 1 comprising storage for the output intensity values.

7. An image processor as claimed in claim 1 comprising image rendering logic for producing the source image.

8. An image processor as claimed in claim 1 comprising an image capture device for producing the source image.

9. An image processor as claimed in claim 1 in the form of a computer workstation incorporating the image processing logic.

10. An image processor as claimed in claim 1 in the form of a camera.

11. An image processor as claimed in claim 1 in which a plurality of component source intensity values (Isi) are defined for each pixel of the source image, said second mapping means determining whether the largest component source intensity value for a pixel is greater than the threshold value (T) and, if so, modifying each component source pixel intensity value proportionately.

12. In an image processor for processing pixel data defining the intensity values of respective pixels of a source image, a method for modifying source pixel data for display on output means capable of displaying pixel intensity values between a minimum value (Imin) and a maximum value (Imax), said method including the steps of:
 applying a linear mapping of source pixel intensity values (Is) ranging between said minimum value (Imin) and a predetermined threshold value (T) intermediate said minimum and maximum values to give output pixel intensity values (Io) ranging between the minimum value (Imin) and the threshold value (T); and
 applying a non-linear mapping of source pixel intensity values (Is) ranging between said threshold value (T) and an upper limit greater than said maximum value (Imax) to give output intensity values (Io) ranging between the threshold value (T) and the maximum value (Imax), said non-linear mapping having a decreasing slope that approaches zero as said source pixel value increases beyond said threshold.

13. A method as claimed in claim 12 in which the output pixel intensity value (Io) asymptotically approaches the maximum value (Imax) as the source pixel intensity value (Is) increases beyond said threshold value (T).

14. A method as claimed in claim 12 in which a plurality of component source intensity values (Isi) are defined for each pixel of the source image, said second mapping step including the steps of determining whether the largest component source intensity value for a pixel is greater than the threshold value (T) and, is so, modifying each component source pixel intensity value proportionately.

15. In an image processor for processing source pixel data defining the intensity values of respect pixels of a source image, a method for modifying said data for display on an output device capable of displaying pixel intensity values within a predetermined range, said method comprising the steps of:
 providing a linear mapping between source pixel intensity values below a threshold intensity value and output pixel intensity values within a first portion of said range;
 providing a non-linear mapping between source pixel intensity values above said threshold intensity value and output pixel intensity values within a second portion of said range, said non-linear mapping having a decreasing slope that approaches zero as said source intensity value increases beyond said threshold.

16. A method as in claim 15 in which the slope of said non-linear mapping approaches the slope of said linear mapping as said source intensity value approaches said threshold.

17. A method as in claim 15 in which a plurality of source pixel intensity values are defined for each pixel of the source image and are mapped to corresponding output pixel intensity values, said method comprising the steps of:
 (a) if the maximum source pixel intensity value for a given pixel is below said threshold:
  (1) providing said linear mapping between each source pixel intensity value for said pixel and the corresponding output pixel intensity value; and
 (b) if the maximum source pixel intensity value for a given pixel is above said threshold:
  (1) providing said non-linear mapping between said maximum source pixel intensity value and the corresponding output pixel intensity value; and
  (2) providing a mapping proportionate to said non-linear mapping between each remaining source pixel intensity value and the corresponding output pixel intensity value.

18. A method as in claim 15 in which said linear mapping maps each source pixel intensity value to itself as an output pixel intensity value.

19. In an image processor for processing pixel data defining the intensity values of respective pixels of a source image, a method for modifying source pixel data for display on output means capable of displaying pixel intensity values between a minimum value (Imin) and a maxium value (Imax), said method including the steps of:
 mapping source pixel intensity values (Is) ranging between said minimum value (Imin) and a predetermined threshold value (T) intermediate said minimum and maximum values to output pixel intensity values (Io) ranging between the minimum value (Imin) and the threshold value (T); and
 mapping source pixel intensity values (Is) ranging between said threshold value (T) and an upper limit greater than said maximum value (Imax) to output intensity values (Io) ranging between the threshold value (T) and the maximum value (Imax) to give an output pixel intensity value (Io) such that:

$$Io = Imax - (Imax - T)^2/(Is + Imax - 2T)$$

20. In an image processor for processing pixel data defining the intensity values of respective pixels of a source image, a plurality of component source pixel intensity values (Isi) being defined for each pixel of the source image, a method for modifying source pixel data for display on output means capable of displaying pixel intensity values between a minimum value (Imin) and a maximum value (Imax), said method including the steps of:
 (a) determining whether the largest component source pixel intensity value (Isi) for a pixel is greater than a predetermined threshold value (T) intermediate said minimum and maximum values;
 (b) if said largest component source pixel intensity value for a pixel is greater than said threshold, linearly mapping said source pixel intensity values (Isi) to output pixel intensity values (Ioi) ranging between the minimum value (Imin) and the threshold value (T); and
(c) if said largest component source pixel intensity value for a pixel is greater than said threshold:
  (A) non-linearly mapping said largest component source pixel intensity value (Isi) to an output intensity value (Io) ranging between the threshold value (T) and the maximum value (Imax); and
  (B) modifying the remaining source pixel intensity values (Isi) for said source pixel proportionately.

21. In an image processor for processing source pixel data defining the intensity values of respective pixels of a source image, a plurality of source pixel intensity values being defined for each pixel of the source image and being mapped to corresponding output pixel intensity values, a method for modifying said data for display on an output device capable of displaying pixel intensity values within a predetermined range, said method comprising the steps of:
(a) if the maximum source pixel intensity value for a given pixel is below a predetermined threshold:
  (1) providing a linear mapping between the source pixel intensity values for said pixel and output pixel intensity values within a first portion of said range; and
(b) if the maximum source pixel intensity value for a given pixel is above said threshold:
  (1) providing a non-linear mapping between said maximum source pixel intensity value and an output pixel intensity value within a second portion of said range; and
  (2) providing a mapping proportionate to said non-linear mapping between each remaining source pixel intensity value and the corresponding output pixel intensity value.

* * * * *